United States Patent [19]

Cooper

[11] Patent Number: 4,781,392

[45] Date of Patent: Nov. 1, 1988

[54] MOLDED BOAT TRAILER

[76] Inventor: Gary J. Cooper, 105 Lakeside, Jackson, Mich. 49201

[21] Appl. No.: 72,771

[22] Filed: Jul. 13, 1987

[51] Int. Cl.⁴ ............................................. B60P 3/10
[52] U.S. Cl. .................................. 280/414.1; 296/901
[58] Field of Search ............... 280/414.1, 414.2, 414.3; 114/344; 296/31 P

[56] References Cited

U.S. PATENT DOCUMENTS

| | | | |
|---|---|---|---|
| 3,098,674 | 7/1963 | White | 280/414.1 X |
| 3,224,019 | 12/1965 | Gudmundson | 114/344 |
| 3,528,095 | 9/1970 | Gudmundson | 280/414.1 |
| 4,395,185 | 7/1983 | Whaley | 414/483 |

FOREIGN PATENT DOCUMENTS 2946922 6/1981 Fed. Rep. of Germany .
1500835 11/1967 France .
2399357 3/1979 France .
6410821 3/1965 Netherlands .

OTHER PUBLICATIONS

"Quay Floating Trailer—Valiant Boats" by Decatur Manufacturing, Inc.

Primary Examiner—John A. Pekar
Attorney, Agent, or Firm—Beaman & Beaman

[57] ABSTRACT

A trailer for boats having a body conforming to the configuration of the trailered boat wherein the trailer and boat have a unitary appearance. The trailer body is preferably molded of a synthetic plastic material and the body cavity in which the boat is received is preferably closed at the bottom to protect the boat hull from road debris. A cover may be mounted upon the trailer to enclose the boat for protection from weather and theft.

21 Claims, 2 Drawing Sheets

MOLDED BOAT TRAILER

BACKGROUND OF THE INVENTION

Boat trailers for towing behind automobiles and trucks are widely used to transport boats of a variety of sizes and hull configurations. Such trailers normally consist of a basic frame of tubular members upon which the road wheels are mounted, the frame includes a tongue attachable to the vehicle, and rails or rollers, or both, are used to support and position the boat on the frame. Usually, a winch is mounted on the frame for pulling the boat onto the trailer during loading.

Conventional boat trailers are substantially "open" wherein the boat hull is fully visible when mounted on the trailer, and the hull is exposed to damage from road debris which may be thrown upwardly by the towing vehicle tires, or the trailer tires. In the past, the appearance of boat trailers was of little concern, and only the utilitarian features were considered significant.

Boat trailers are known wherein the boat is somewhat "cradled" between trailer-mounted support rails, as shown in U.S. Pat. No. 4,395,185, and it is also known to construct a boat trailer with a "closed" bottom which would protect the hull of a trailered boat, as shown in U.S. Pat. No. 3,528,095. However, prior art boat trailers do not provide the degree of hull protection required to completely protect the boat from road debris and prior art boat trailers are not of such form and configuration as to produce a unitary appearance with the trailered boat. It is an object of the invention to provide a boat trailer having a body which substantially completely protects the hull of the trailered boat from exposure to damage from road debris.

A further object of the invention is to provide a boat trailer which is of a configuration which is pleasing in appearance, streamlined, having low wind drag resistance, and having a boat-receiving cavity so configured that the trailered boat and trailer have a very pleasing unitary appearance.

Another object of the invention is to provide a boat trailer having a body molded of a synthetic plastic material whereby the configuration of the trailer may be readily designed as desired by the manufacturer, and wherein a unitary appearance between trailer and trailered boat is achieved.

Yet another object of the invention is to provide a boat trailer having a substantially rigid cover for enclosing the trailered boat, the cover including a lockable latch whereby the cover will both protect the boat from damage and the weather, and will secure the boat contents against theft.

In the practice of the invention the trailer body is formed of a molded synthetic plastic reinforced glass fiber plastic material, i.e. a steel frame may be used to reinforce or support the body, and road wheels are mounted upon the body, or the reinforcing frame. At its front end the body, or frame, includes a tongue for attaching the trailer to the towing vehicle.

The body includes an upper surface, lateral sides and a rear, and a boat hull receiving cavity is defined in the cavity intersecting the upper surface and the rear, is located between the body lateral sides. The cavity is of a configuration preferably conforming to the configuration of the hull of the boat to be trailered. The upper edges of the body and cavity lateral sides preferably terminate at approximately the water line of the trailered boat when the boat is received within the cavity. A resilient liner may be located within the cavity for the protection of the boat and trailer.

Preferably, the trailer is of a streamlined configuration, and as the boat hull is closely received within the cavity, the trailer boat and trailer will have a low resistance to air flow and a streamlined unitary appearance when viewed from the side.

The bottom of the cavity is preferably "closed" to completely protect the trailered boat hull from road debris, and, preferably, the trailer body will be painted with colors to match the colors of the boat wherein a most attractive unitary appearance of the boat and trailer is achieved.

A semi-rigid synthetic plastic cover may be hinged to the body at a front region whereby the cover may be raised and maintained in a raised position by an adjustable prop, and upon being lowered to the body upper portion the interior of the trailer boat will be completely enclosed. A lockable latch interposed between the cover and trailer body will prevent unauthorized raising of the cover, and the cover will keep rain and debris from entering the trailered boat, and also secure the boat contents from theft, which is an important factor to fishermen who often prefer to leave their equipment within the boat during trailering.

A boat trailer constructed in accord with the inventive concepts may be manufactured using conventional manufacturing techniques, and launching of a boat from the trailer, or loading the boat in the trailer, may be readily accomplished, and a boat winch may be mounted upon the trailer to aid in loading, if desired.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 2:
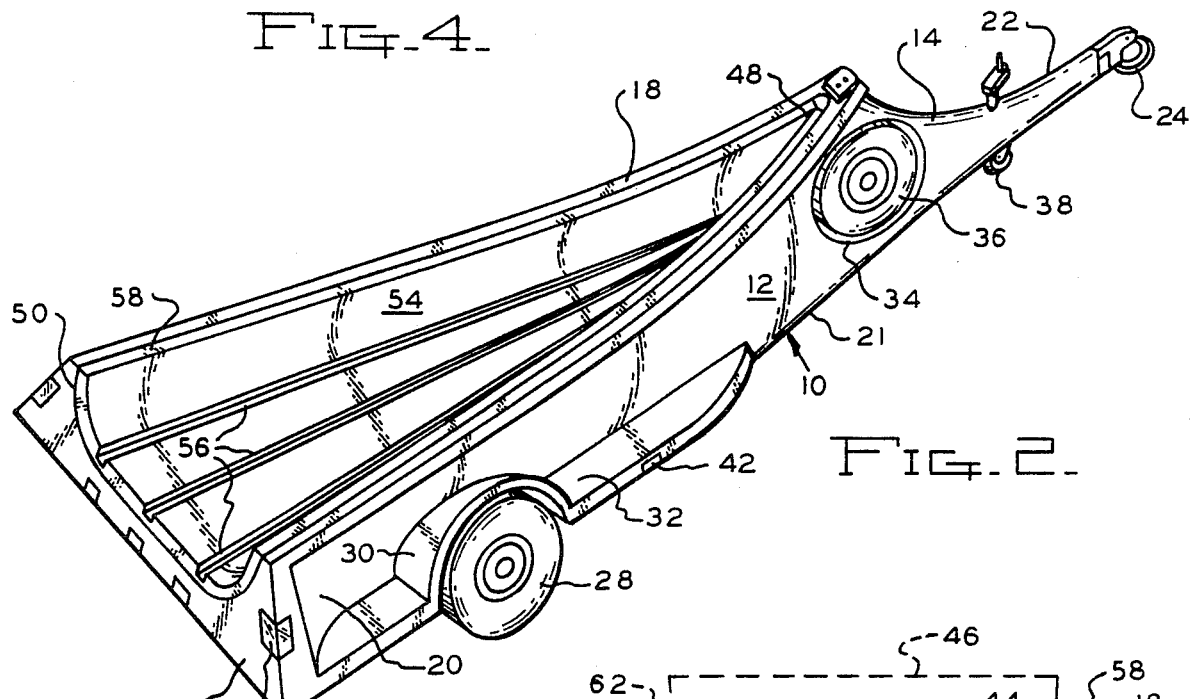
FIG. 2 is a perspective view of a trailer in accord with the invention.
Figure 3:
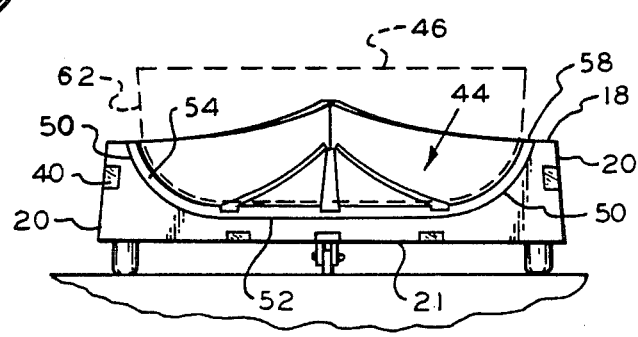
FIG. 3 is a rear view of the boat trailer, the boat hull being shown in dotted lines.

The construction of a boat trailer in accord with the invention is best appreciated from FIG. 2. The trailer 10 includes a body 12 which is preferably molded of a synthetic plastic material such as glass fabric impregnated with a resin, such material being commonly used in the manufacture of boats. The body includes a front 14, a rear 16, an upper surface 18, and lateral sides 20 and bottom 21. A metal frame or similar reinforcement, not shown, may be incorporated into the material of the body to add strength and rigidity, or such reinforcing members may be formed of wood, or the like, as is commonly known in the construction of molded glass fiber products. A tongue 22 extends forwardly of the body 12, and a reinforcing member, such as a steel tubular element, not shown, is located within the tongue terminating in a conventional trailer hitch 24.

Figure 4:
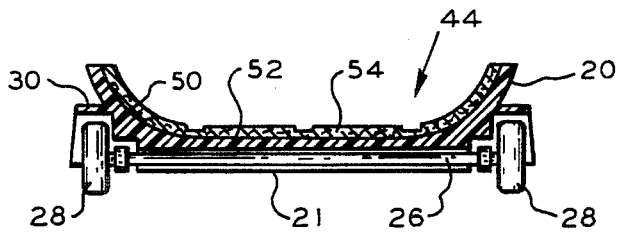
FIG. 4 is an elevational, sectional view as taken along Section IV—IV of FIG. 1, the boat not being illustrated.

An axle 26 is incorporated into the body material as shown in FIG. 4, and road wheels 28 are rotatably mounted upon the axle. Suspension structure may be interposed between the axle and the wheels 28, not shown, but one type of suspension that would be acceptable is that utilizing crank arms and elastomeric elements in that such suspensions provide effective cushioning in a limited space and low road clearance.

The body 12 includes wheel wells within fenders 30, and running boards 32 may be homogeneously molded into the body, as are the fenders. A recess 34 for a spare tire is defined in the body for receiving the spare tire 36. A conventional tongue jack 38 is incorporated into the tongue 22, and at its rear end tail lights 40 may be incorporated into the body and reflectors 42 located at the rear and sides. As will be appreciated from the drawings, the trailer is of a generally triangular shape pointing in the forward direction as to be streamlined and aerodynamically "clean" insuring a low wind resistance.

A cavity 44 is defined in the body 12 for receiving the trailered boat 46. The cavity 44 is of a configuration generally corresponding to that of the trailer body having an apex at 48, and including lateral sides 50 which radius into a bottom 52. The lateral sides 50 of the cavity are located between the trailer lateral sides 20, and the cavity bottom 52 is disposed adjacent the trailer bottom 21, which is, preferably, of a continuous closed configuration whereby road debris may not enter the cavity. The cavity may be lined with a resilient liner 54 of rubber or foam conforming to the configuration of the cavity, and the liner may include recesses 56 to aid in the draining of water from the cavity.

As will be appreciated from the drawings, the cavity upper edge 58 is aligned with the body upper surface 18, and when a boat 46 is received within the cavity 44 the upper edge 58, preferably, is at approximately the water line of the trailered boat.

Figure 1:
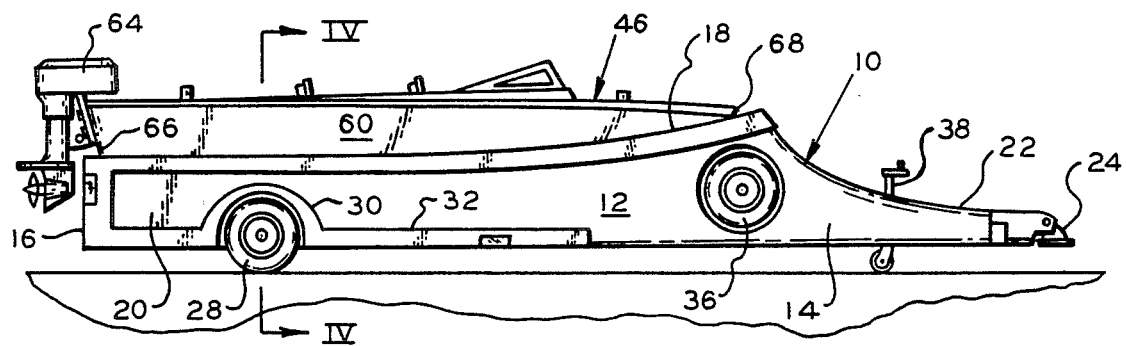
FIG. 1 is a side elevational view of a boat trailer in accord with the invention illustrating a boat mounted thereon.

A typical boat 46 is shown in FIG. 1 of the type which would be received within the boat cavity 44. The boat includes a hull 60 having lateral sides 62 which are of a convex configuration conforming to the configuration of the cavity lateral sides 50. An outboard motor 64 is mounted upon the boat stern 66, and the boat bow 68 will be closely received within the cavity apex 48.

As will be appreciated from the drawings, the close complementary configuration of the boat hull 60 to the cavity 44 will provide excellent support of the boat in the cavity, eliminating pressure points on the boat hull as occurs with conventional boat trailers using rails or rollers. The resilient liner 54 will permit an even distribution of the boat weight in the cavity and a firm solid support for the boat is provided during trailering.

A boat winch, not shown, may be mounted upon the front end of the trailer body and be of either the manual or electric type for aiding in loading the boat. If desired, rollers could be located on the trailer rear adjacent the cavity 44, but as the illustrated trailer is low slung and has a minimum ground clearance, it is possible to back the trailer into the water to such a depth as to easily float the boat free of the trailer, and during loading to fully float the boat into the trailer cavity, thereby simplifying launching and trailer loading.

As the boat hull 60 is completely protected by the cavity 44, and as the lower portion of the sides of the hull will also be located within the cavity, the boat hull is well protected against debris which may be thrown upward by the wheels of the towing vehicle or trailer. Thus, a trailer constructed in accord with the invention may have low ground clearance without endangering the boat hull.

As the boat hull sits well within the trailer cavity, and closely conforms to the configuration of the cavity, the trailered boat will have a unitary appearance with respect to the trailer, as will be appreciated from FIG. 1. Thus, an unusually attractive appearance is achieved by the trailer and boat, and by using matching or identical colors for the trailer and boat, the aesthetic requirements of the most discriminating trailer and boat owner may be readily achieved.

Figure 5:
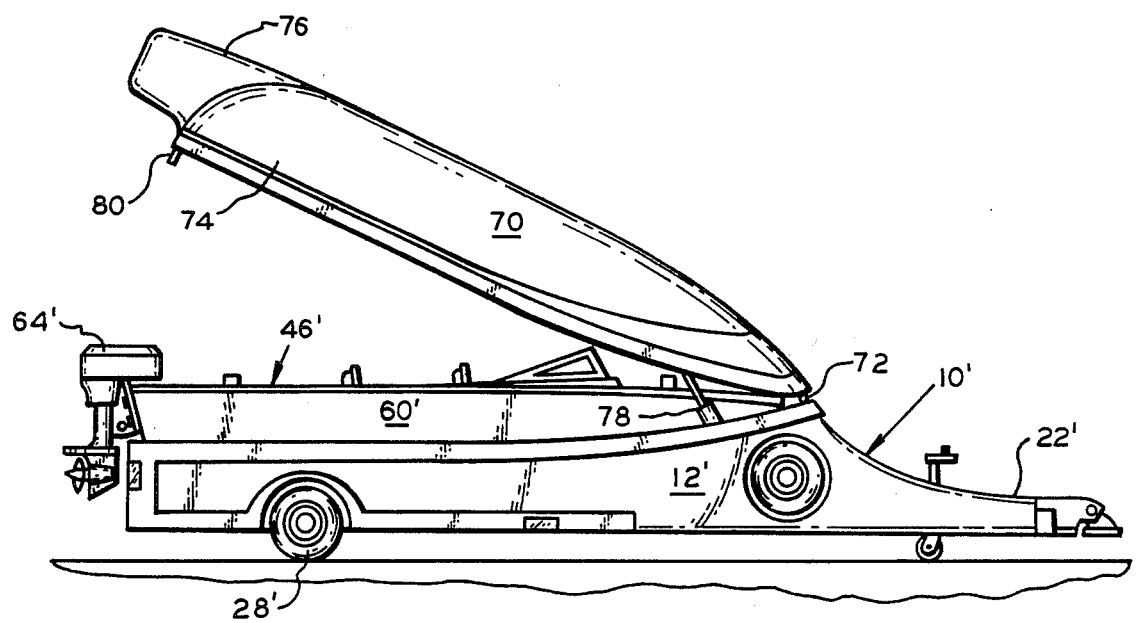
FIG. 5 is a side elevational view of a boat trailer in accord with the invention having a boat mounted thereon and wherein a pivoted cover is mounted on the trailer and is shown in the elevated position.
Figure 6:
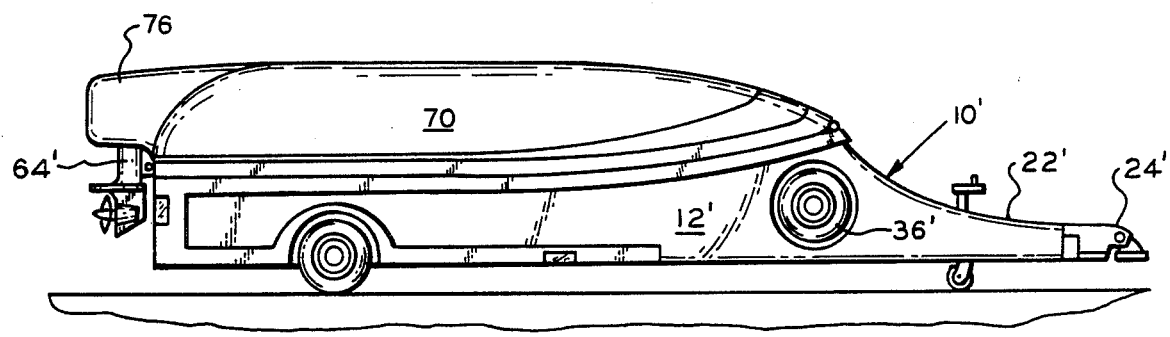
FIG. 6 is an elevational view similar to FIG. 5 illustrating the cover in the closed position.
Figure 7:
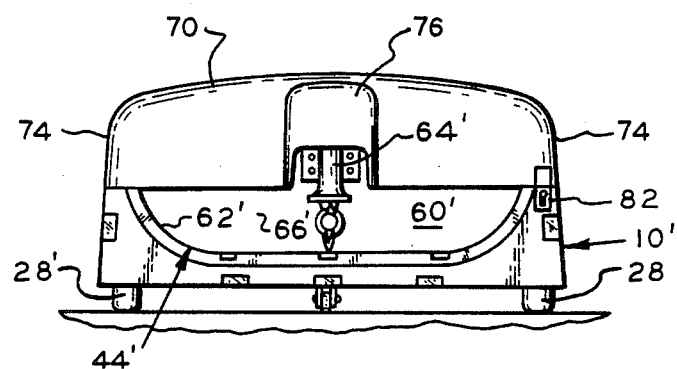
FIG. 7 is a rear, elevational view of FIG. 6.

A variation of the boat trailer is shown in FIGS. 5-7, and in these figures components identical to those previously described are indicated by primed reference numerals.

In FIGS. 5-7 a cover 70 is pivotally mounted to the trailer body by a hinge 72. The cover 70 is of a substantially rigid character and is formed of a synthetic plastic glass fiber material and is of a rounded streamlined configuration as will be readily appreciated from the drawings. The cover sides 74 align with the lateral sides 20 of the body when the cover is in the closed position, as will be appreciated from FIG. 7, and the rear portion of the cover is provided with a rearwardly extending housing 76 which will fit over the outboard motor 64 as shown in FIGS. 6 and 7.

The cover 70 may be maintained in the raised position by a pair of extendable props 78 interposed between the upper portion of the trailer and the cover. Such props may be of the air spring type commonly used with automobiles, and it is necessary for the cover to be sufficiently raised to permit the boat to be readily loaded within the cavity.

Lock means in the form of a lock plunger 80 located at the rear of the cover is received within a lock 82 located at the rear 16 of the trailer body 12 such that upon pivoting the cover to the closed condition these locking components engage preventing unauthorized raising of the cover 70 until the key has been inserted into the lock 82 for releasing the same. As the cover 70 is of a substantially rigid configuration it will add to the streamlined form of the trailer, prevent the entrance of rain, snow and debris into a boat located on the trailer, and will prevent theft of articles located within the trailered boat. Thus, fishermen may keep their fishing gear within the boat during trailering without fear of losing such equipment during trailering due to wind, or theft when parked.

Of course, the configuration of the cavity 44 will differ depending on the type and shape of the boat hull to be trailered, and it is expected that, in most cases, the trailer of the invention, and the boat to be used therewith, will be sold as a unit, so that the trailer cavity will closely conform to the hull configuration, and the color combinations coordinated. Boats having various types of keels or other hull configurations may be readily accommodated by forming similar configurations in the trailer cavity, and it is anticipated that sailboats having relatively large keels and centerboards can be accommodated with trailers using the inventive concepts.

A boat trailer utilizing the features of the invention will have low drag due to wind resistance, and a minimum time is required to launch and load the boat, and yet the boat contents are readily secured and protected by the trailer when using a cover therewith.

It is appreciated that various modifications to the inventive concepts may be apparent to those skilled in the art without departing from the spirit and scope of the invention.

I claim:

1. A boat trailer characterized by its ability to conform to the hull configuration of a trailered boat having an upper bow point comprising, in combination, a body having a front, a rear, lateral sides, an upper portion and a bottom portion, wheels mounted upon said body bottom portion, a tongue defined on said body front extending in a forward direction, a cavity defined in said body upper portion having lateral sides and located intermediate said body lateral sides and intersecting said body rear, said body lateral sides and said cavity lateral sides respectively intersecting at a front apex and enclosing a substantial portion of the sides of a boat located within said cavity and the boat upper bow point being substantially within said front apex whereby said trailer body and the boat produce a unitary appearance.

2. In a boat trailer as in claim 1, wherein said body bottom portion is enclosed to protect the hull of a boat located within said cavity.

3. In a boat trailer as in claim 2, said cavity including a bottom, and a resilient liner mounted upon said cavity bottom for directly engaging the hull of a boat received within said cavity.

4. In a boat trailer as in claim 1, said cavity lateral sides having a configuration complementary to the configuration of the sides of the boat to be trailered within said cavity.

5. In a boat trailer as in claim 1, said body lateral sides intersecting said body upper portion at a vertical orientation to said cavity substantially equal to the water line of a boat trailered within said cavity.

6. In a boat trailer as in claim 1, said body being molded of a synthetic plastic material.

7. In a boat trailer as in claim 6, said synthetic plastic material comprising resin impregnated glass fibre.

8. In a boat trailer as in claim 1, said body lateral sides each having a substantially linear upper surface adjacent the body rear and a concave surface adjacent said front apex.

9. A boat trailer characterized by its ability to conform to the hull configuration of the trailered boat comprising, in combination, a body having a front, a rear, lateral sides, an upper portion and a bottom portion, wheels mounted upon said body bottom portion, a tongue defined on said body front extending in a forward direction, a cavity defined in said body upper portion having lateral sides and located intermediate said body lateral sides and intersecting said body rear, said body and cavity lateral sides enclosing a portion of the sides of a boat located within said cavity whereby said trailer body and the boat produce a unitary appearance, a substantially rigid cover having a front end and a rear end, and a latch releasably mounting said cover upon said body whereby said cover is superimposed over said cavity and a boat located therein.

10. In a boat trailer as in claim 9, hinge means pivotally connecting said cover front end to said body upper portion, and prop means interposed between said cover and body to maintain said cover in an elevated position.

11. In a boat trailer as in claim 10, a latch defined on said cover rear end cooperable with latch receiving means defined on said body rear upon said cover being pivoted to a closed position.

12. In a boat trailer as in claim 9, said substantially rigid cover having a lower peripheral edge, said body lateral sides having an upper surface, said cover lower peripheral edge engaging said body lateral sides upper surface when said cover is in a closed position.

13. In a boat trailer as in claim 9, hinge means pivotally connecting said cover to said body upper portion.

14. A boat trailer comprising, in combination, a body of molded synthetic material having a front, a rear, lateral sides, an upper portion and a bottom portion, wheels mounted upon said body bottom portion, a tongue defined on said body front extending in a forward direction, a boat hull receiving cavity defined in said body located intermediate said lateral sides and intersecting said body upper portion and rear, said cavity having a configuration complementary to the hull of the boat to be received therein for trailering and having an apex located adjacent said body front, said cavity having a substantially closed bottom adjacent said body bottom portion, a substantially rigid cover having a front end and a rear end, and a latch releasably mounting said cover upon said body whereby said cover is superimposed over said cavity and a boat located therein.

15. In a boat trailer as in claim 14, hinge means pivotally connecting said cover front end to said body upper portion, and prop means interposed between said cover and body to maintain said cover in an elevated position.

16. In combination, a boat having a hull having a pointed bow having an upper bow point, lateral sides, a bottom, a stern and a water line, a boat trailer having a body, said body having a front, a rear, lateral sides having an upper edge of a vertical dimension generally less than that of said hull lateral sides and intersecting at an apex adjacent said body front, an upper portion and a bottom portion, wheels mounted upon said body bottom portion, a tongue defined on said body front extending in a forward direction, a cavity defined in said body intersecting said body upper portion and rear, said cavity having lateral sides and a bottom and being of a size and configuration generally complementary to that of said boat hull whereby said boat may be received within said cavity, said boat upper bow point being received within said apex and said trailer body and boat having a unitary appearance.

17. In a combination as in claim 16, said body lateral sides intersecting said body upper portion at a vertical location substantially corresponding to said boat hull water line when said boat is within said cavity.

18. In a combination as in claim 16, said trailer body being molded of a synthetic plastic material.

19. In combination, a boat having a hull having a pointed bow, lateral sides, a bottom, a stern and a water line, a boat trailer having a body, said body having a front, a rear, lateral sides of a vertical dimension less than that of said hull lateral sides, an upper portion and a bottom portion, wheels mounted upon said body bottom portion, a tongue defined on said body front extending in a forward direction, a cavity defined in said body intersecting said body upper portion and rear, said cavity having lateral sides and a bottom and being of a size and configuration generally complementary to that of said boat hull wherein upon said boat being received within said cavity said trailer body and boat having a unitary appearance, a substantially rigid cover having a front end and a rear end, and a latch releasably mounting said cover upon said body whereby said cover is superimposed over said cavity and a boat located therein.

20. In a combination as in claim 19, hinge means pivotally connecting said cover front end to said body upper portion, and prop means interposed between said cover and body to maintain said cover in an elevated position.

21. In combination, a boat having a hull having a pointed bow, lateral sides, a bottom, a stern and a water line, a boat trailer having a body, said body having a front, a rear, lateral sides of a vertical dimension less than that of said hull lateral sides, an upper portion and a bottom porton, wheels mounted upon said body bottom portion, a tongue defined on said body front extending in a forward direction, a cavity defined in said body intersecting said body upper portion and rear, said cavity having lateral sides and a bottom and being of a size and configuration generally complementary to that of said boat hull, said body lateral sides having a vertical dimension wherein the upper surface of said body lateral sides adjacent said body rear and intermediate said body rear and front is substantially equal to the water line of said boat wherein upon said boat being received within said cavity said trailer body and boat having a unitary appearance.

* * * * *